Nov. 8, 1932.                H. J. L. FRANK                 1,887,088
                          PANEL BOARD CABINET
                         Filed May 31, 1929        2 Sheets-Sheet 1
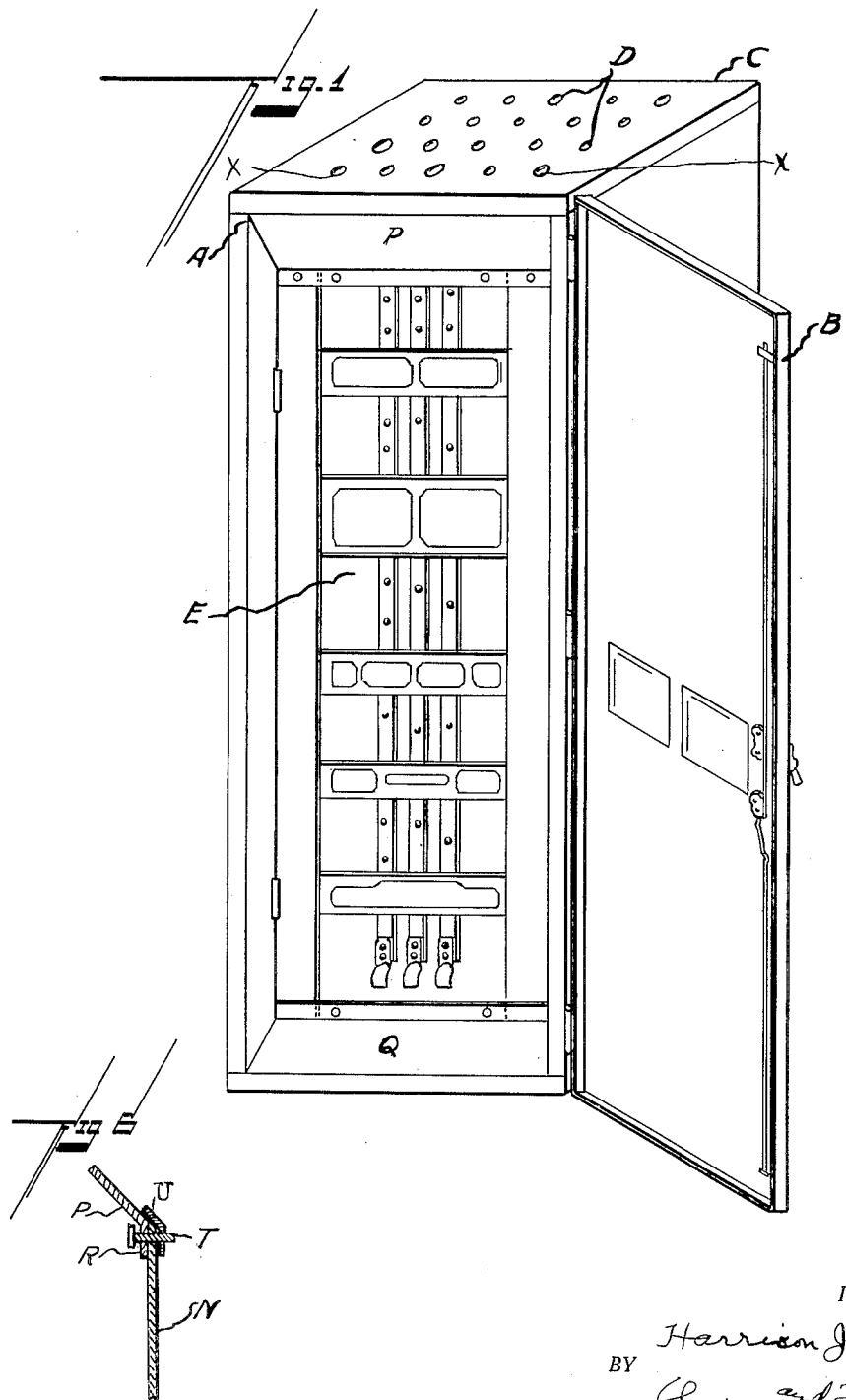
INVENTOR.
Harrison J. L. Frank
BY
Swan and Frye
ATTORNEYS Nov. 8, 1932.  H. J. L. FRANK  1,887,088
PANEL BOARD CABINET
Filed May 31, 1929  2 Sheets-Sheet 2
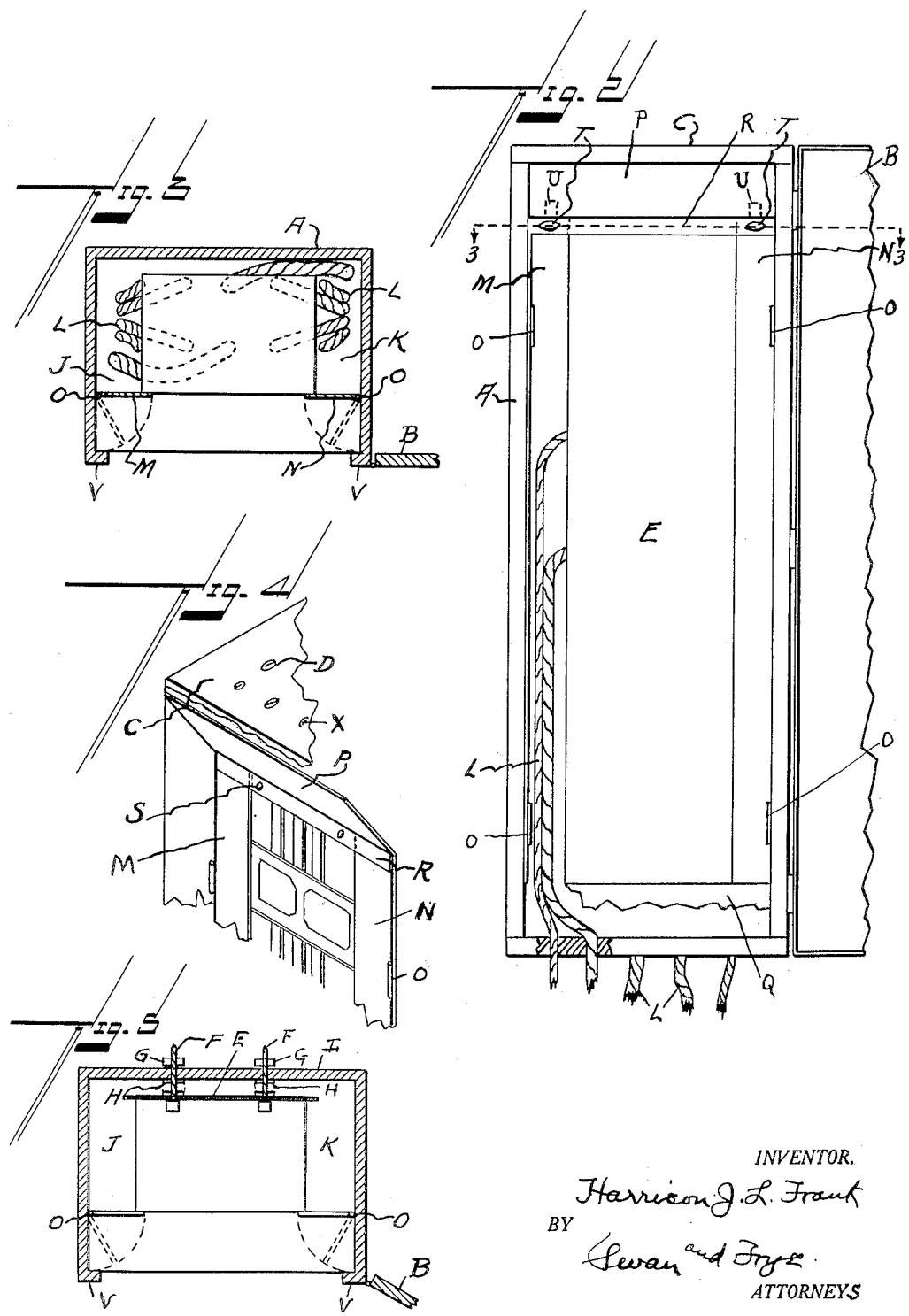
INVENTOR.
Harrison J. L. Frank
BY
Swan and Frye
ATTORNEYS Patented Nov. 8, 1932

1,887,088

UNITED STATES PATENT OFFICE

HARRISON J. L. FRANK, OF HAMTRAMCK, MICHIGAN, ASSIGNOR TO BULL DOG ELECTRIC PRODUCTS COMPANY, OF HAMTRAMCK, MICHIGAN, A CORPORATION OF WEST VIRGINIA

PANEL BOARD CABINET

Application filed May 31, 1929. Serial No. 367,472.

This invention relates to panel board cabinets for convenient and yet accessible housing of switch panels and similar electrical apparatus, which both for protection of the apparatus from dust and for the sake of protection of its surroundings against fire, due to circuit flashings, it is advisable to enclose within a metallic shell.

It has for its object an improved organization of parts by means of which the panel may be spacedly supported within the shell or box and its cable connections effectively screened from view though easily accessible. Provision is also made for effecting the selective and properly located passage of cable members through the walls of the box by means of a number of knock-out sections positioned in the end panel thereof.

In the drawings:

Figure 1 is a perspective of my improved device.

Figure 2 is an elevational view thereof with the door open bringing out the accessibility of the cables to the various parts of the contained switch panel, and to the knock-out inlet apertures, as well as emphasizing the accessibility of the cables in the alleys on either side of the switch panel.

Figure 3 is a sectional plan view taken along the line 3—3 of Figure 2 and looking in the direction of the arrows there shown.

Figure 4 is a fragmentary perspective view bringing out the positioning and over-engagement of the cable-concealing panels by the obliquely positioned panel at the top of the box or shell.

Figure 5 is a sectional plan view designed to bring out the spaced supporting of the panel board from the rear wall of the cabinet.

Figure 6 is a detail view partly in section of a preferred form of manually actuatable clamp for locking the end plates or closure pieces in assembled relation to the long hinged lateral closure panels.

A indicates a sheet metal box or cabinet of suitable dimensions, provided with a panel door B, and having at least one end as C provided with a plurality of knock-out holes D of variant size, to accommodate different sizes of cables. Within the box or shell, and preferably spaced from even the rear wall thereof, is the switch panel E, which may be of any desired construction as to details, and which is spacedly supported from the rear panel of the box by means of threaded stems F and threaded spacer and clinching nuts G and H, which engage upon the threaded stem F on either side of the rear wall I of the cabinet structure. This positioning of the switch panel E leaves it also spaced from the two side walls of the box by the alleys J and K, lengthwise of which may pass the several cables L leading to their intended connections on the panel board. It is often desirable to secure access to these cables with a minimum of disassemblage of the other parts, and this access is effectively afforded by these alleys J and K.

When the cables are not being changed or worked upon, it is, however, highly desirable to have them screened or protected from access or view, and to this end I hingedly support as from points O on the side walls of the box A, a pair of relatively long and narrow hinged panels M and N, which when access to the alleys is desired, may be swung to positions of such parallelism as may be desired with the side walls of the box A as brought out in Figures 3 and 5. Obviously brackets could be used for supporting these narrow panels in place of the hinges shown. When in position, these long and narrow panel sections as a rule slightly over-engage with their free or swinging edges the marginal edges of the forward face of the panel board E, thus substantially lying in the same plane therewith or at a slight angle thereto as may be preferred and presenting a practically unbroken front surface, as the door of the box A is opened and thus screening from view or access the alleys on either side of the panel board. This described positioning of these long and narrow hinged panel members M and N would leave uncovered spaces at the top and the bottom of the panel board E, were it not for the provision of sloping or inwardly inclined cornice or finishing plates appurtenant these spaces P and Q, each of which is provided with a relatively narrow flange, as R, through which clamps or bolts S extend for temporary structural correlation of these flanges R with the side panels M and N, to hold these parts in desired relation with respect to the switch panel board, or through which clamps or screws T may be driven into the body of the panel board E. The outer edges of the members P and Q extend to substantial intersection with the forward edge of the top C of the box and similarly at the bottom, and not only form very effective finishing plates in cooperation with the panels M and N, but as well, serve, by their overengagement with the top and bottom ends thereof, to hold the latter in firm position substantially in line with the front face of the panel board so that if viewed from the front, the appearance of the structure is that of a completely assembled and inaccessibly built-in panel board, whereas, the fact is that by the removal of these parts P and Q, after first loosening their screws S, they can be removed, and thereafter the long and narrow panels M and N may be swung to the position indicated in Figures 3 and 5, thus giving access to both sides of the panel board as well as the mechanism or parts supported by its front face.

It is preferable, though not essential, that the cabinet be formed with overengaging edge flanges, as V, in order that, when not in use, the side panels M and N may be swung flat against the sides of the cabinet and yet not have their then exposed faces extending beyond the plane of the outer edges of these flanges. Similarly the free or outer edges of the top and bottom cornice pieces P and Q fit conveniently thereunder or thereagainst at the top and bottom edges of the cabinet, without leaving a poorly fitting edge showing.

While in some cases the attachment of these cornice pieces to the panel board by means of screws or bolts S is desirable, I desire to call attention to the fact in case for any reason the omission of the panel board is desired, the marginal finishing structure formed by the members M, N, P and Q may be correlated in their described extended position without impairment of its efficiency due to the absence of the panel board.

It should also be noted that the additional angular space above and below the panel board which is afforded by the described sloping position of the end panels P and Q thus makes it possible to bring in one or more of the cables L through one of the knock out holes in the end of the cabinet relatively near its front edge, as for example those designated as X in Figure 1 and then easily curve them into proper alignment in the alleys M or N, since, just after entering the cabinet they may pass through one of these angled spaces which afford ample room therefor accordingly.

It will of course be obvious that the structural idea herein disclosed could be applied without departure from the intended scope hereof, to a construction wherein the end coverage panels are hinged and the relatively long and narrow side panels are made to function as the herein shown angled end panels P and Q here act, or indeed to a construction embodying the marginal edge hinging of all four bordering panels, these being held in assembled relation by bolts T and overengaging clips or reinforcing pieces U, as brought out in Figures 2 and 6.

Having described my invention, what I claim is:

In combination, a sheet metal cabinet having ends whose planes are horizontal and sides whose planes are vertical, a panel board therein, disposed in spaced relation to the ends and sides thereof, and secured thereto by means passing thru the cabinet back, sheet metal side plates covering the spaces between the panel board sides and the cabinet sides and hingedly secured to the cabinet sides so as to swing on vertical axes, from and against the panel board, and removably disposed sheet metal end plates in front of the side plates and covering the spaces between the panel board ends and the cabinet ends and overlapping the side plates, the end plates being provided with means secured thereto and projecting forwardly therefrom and accessible from the front of the cabinet to serve as handles whereby the end plates may be manipulated, and also serving to secure the end plates in place in the end spaces.

In testimony whereof I sign this specification.

HARRISON J. L. FRANK.